United States Patent
Ogawa et al.

(10) Patent No.: US 6,288,204 B1
(45) Date of Patent: Sep. 11, 2001

(54) BRANCHED POLYCARBONATE RESIN AND PROCESS FOR PRODUCING THE SAME

(75) Inventors: Noriyoshi Ogawa; Takahiro Adachi; Mitsuhiko Masumoto; Noriaki Honda, all of Toyonaka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/414,424

(22) Filed: Oct. 7, 1999

(30) Foreign Application Priority Data

Oct. 12, 1998 (JP) .................................................. 10-289557

(51) Int. Cl.[7] .................................................. C08G 64/00
(52) U.S. Cl. .......................................... 528/196; 528/198
(58) Field of Search ..................................... 528/196, 198

(56) References Cited

FOREIGN PATENT DOCUMENTS

| | | | |
|---|---|---|---|
| 44-17149 | 7/1969 | (JP) . | |
| 47-23918 | 7/1972 | (JP) . | |
| 3-15658 | 3/1991 | (JP) | C08G/64/20 |
| 3-42288 | 6/1991 | (JP) | C08G/64/16 |
| 4-69178 | 11/1992 | (JP) | C08G/64/14 |
| 6-84429 | 10/1994 | (JP) | C08G/64/14 |
| 7-103235 | 11/1995 | (JP) | C08G/64/14 |

*Primary Examiner*—Terressa M. Boykin
(74) *Attorney, Agent, or Firm*—Sughrue, Mion, Zinn, Macpeak & Seas, PLLC

(57) ABSTRACT

A branched polycarbonate resin having a viscosity average molecular weight (Mv) of 15,000 to 45,000, number of dichloromethane insoluble gel like particle with a particle diameter more than 50 μm being 10 or below per 100 g of the resin, obtained by reacting bisphenol, trihydric or above phenol as branching agent, monohydric phenol as molecular weight modifier and phosgene in the presence of both an alkali aqueous solution and organic solvent to polymerize and a process for producing the same.

8 Claims, No Drawings

BRANCHED POLYCARBONATE RESIN AND PROCESS FOR PRODUCING THE SAME

BACKGROUND OF THE INVENTION

1. Field on the Invention

The present invention relates to a branched polycarbonate resin in which a content of gel like peculiar substances to exert an influence upon appearance and mechanical properties is small and a process for producing the same.

2. Prior Art

Hitherto, polycarbonate resin has been used in a wide range as engineering plastic excellent in transparency, mechanical strength and heat stability. Polycarbonate resin can be molded by various molding methods. Particularly, when a large type of molded article was produced by blow molding or extrusion molding, Newtonian flowability became problematic and the phenomenon of so called drawdown due to weight of polycarbonate resin itself often occurred, so that it was difficult to obtain an intended molded article.

Accordingly, in order to prevent the drawdown, polycarbonate resin to reveal non-Newtonian flowability to a great extent is preferable. As a process for producing a polycarbonate resin having such property, i.e., suitable structural viscosity, processes to use a branching agent are known For example, Japanese Patent Publication Nos. 44-17149 and 47-23918 disclose branched polycarbonate resins used phloroglucin, 4,6-dimethyl-2,4,6-tri-(4-hydroxyphenyl)-heptane-2,1,3,5-tri-(4-hydroxyphenyl)-benzol, 1,1,1-tri-(4-hydroxyphenyl) ethane, trimelltic acid, etc, as branching agent When the branching agent was used, molding was improved. However, there occurred the problem that a portion of properties of polycarbonate resin thus obtained, particularly, impact resistance was decreased.

In order to solve the problem for improvement of impact resistance, Japanese Patent Publication Nos. 6-84429 and 7-103235 disclose arts in which molecular weight of branched polycarbonate resin is specified and acetone soluble component is limited. Although impact resistance at a low temperature was improved in the arts, effect of improvement of impact resistance at a room temperature was not satisfactory. Further, molded articles used branched polycarbonate resin sometimes provided scattering of impact resistance value, so that further improvement has been desired.

On the other hand, when branching in branched polycarbonate resin proceeded to an exceeding extent, the problem of generation of solvent insoluble gel occurred. Japanese Patent Publication Nos. 3-15658, 3-42288 and 4-69178 disclose branched polycarbonate resins in which generation of solvent insoluble gel has been depressed by specifying a process for production of branched polycarbonate resin. However, the definition of the gel was not clear and there was no disclosure concerning influence of the gel to exert upon properties of branched polycarbonate resin.

SUMMARY OF THE INVENTION

An object of the present invention is to provide a branched polycarbonate resin in which a non-dissolved gel like particle content in the branched polycarbonate resin solution is far smaller than that in conventional polycarbonate resin and blow molding and extrusion molding can be suitably applied and a process for producing the same.

As a result of extensive studies to solve the prior art problems, the inventors have found that a branched polycarbonate resin with excellent impact resistance at a room temperature can be obtained by optimizing a timing of addition of monomer(s), a branching agent, a tetraammonium salt, a molecular weight modifier and a polymerization catalyst, thereby decreasing a content of good solvent insoluble gel component with a particle diameter more than 50 $\mu$m as much as possible and accomplished the present invention.

That is, the present invention provides a branched polycarbonate resin having a viscosity average molecular weight (Mv) of 15,000 to 45,000, number of dichloromethane insoluble gel like particle with a particle diameter more than 50 $\mu$m being 10 or below per 100 g of the resin, obtained by reacting bisphenol, trihydric or above phenol as branching agent, monohydric phenol as molecular weight modifier and phosgene in the presence of both an alkali aqueous solution and organic solvent to polymerize.

Further, the present invention a process for producing a branched polycarbonate resin comprising the steps of:

reacting bisphenol, trihydric or above phenol as branching agent and phosgene in the presence of both an alkali aqueous solution and organic solvent, then, further adding a tetraammonium salt to the reaction mixture, thereby, starting polycondensation reaction, then, adding both monohydric phenol as molecular weight modifier and a tertiary amine polymerization catalyst to the reaction mixture, further performing polycondensation reaction, and thereby, obtaining the branched polycarbonate resin having a viscosity average molecular weight (Mv) of 15,000 to 45,000, number of dichloromethane insoluble gel like particle with a particle diameter more than 50 $\mu$m being 10 or below per 100 g of the resin.

The present invention provides also a process for producing a branched polycarbonate resin comprising the steps of:

reacting bisphenol, trihydric or above phenol as branching agent and phosgene in the presence of both an alkali aqueous solution and organic solvent, then, further adding a tetraammonium salt to the reaction mixture, thereby, starting polycondensation reaction, after a viscosity average molecular weight (Mv) of the reaction mixture containing the resultant products has reached to 3,000 above and less than 6,000, adding both monohydric phenol as molecular weight modifier and a tertiary amine polymerization catalyst to the reaction mixture, further performing polycondensation reaction, and thereby, obtaining the branched polycarbonate resin having a viscosity average molecular weight (Mv) of 15,000 to 45,000, number of dichloromethane insoluble gel like particle with a particle diameter more than 50 $\mu$m being 10 or below per 100 g of the resin.

DETAILED DESCRIPTION OF THE INVENTION

The present invention will be described in detail below.

The branched polycarbonate resin of the present invention can be obtained by the same process for production as conventional process for production according to a phosgene process except the steps comprising forming a reaction mixture while adding phosgene in bisphenol and trihydric or above phenol and after the completion of addition of phosgene, adding a tetraammonium salt to the reaction mixture to perform polycondensation reaction, then adding both monohydric phenol and a tertiary amine catalyst to the reaction mixture, further preforming polycondensation reaction, thereby obtaining a branched polycarbonate resin wherein number of dichloromethane insoluble gel like particle with a particle diameter more than 50 μm is 10 or below per 100 g of the resin.

Examples of bisphenols as a raw material to derive the branched polycarbonate resin include 4,4'-biphenyldiol, 1,1'-bi-2-naphthol, bis(4-hydroxyphenyl) methane, bis(4-hydroxphenyl)ether, bis(4-hydroxyphenyl)sulfone, bis(4-hydroxyphenyl)sulfoxide, bis(4-hydroxyphenyl)sulfide, bis (4-hydroxyphenyl)ketone, 1,1-bis(4-hydroxyphenyl)ethane, 2,2-bis(4-hydroxyphenyl) propane(bisphenol A; BPA), 2,2-bis(4-hydroxyphenyl) butane, 1,1-bis(4-hydroxyphenyl) cyclohexane(bisphenol Z; BPZ), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl) diphenylmethane, 2,2-bis(4-hydroxyphenyl) hexafluoropropane, α,ω-bis[2-(p-hydroxyphenyl)ethyl] polydimethylsiloxane, α,ω-bis[3-(o-hydroxyphenyl) propyl]polydimethylsiloxane, 9,9-bis(4-hydroxyphenyl) fluorene, 2,2-bis(4-hydroxy-3-allylphenyl)propane, 4,4'-[1, 4-phenylenebis(1-methylethylidene)]bisphenol, 4,4'-[1,3-phenylenebis(1-methylethylidene)]bisphenol, 1,1,3-trimethyl-3-[(4-hydroxy)phenyl]-5-hydroxyindan, 3,3,3',3'-tetramethyl-2,3,2',3'-tetrahydro-(1,1'-spirobiinden)-6,6'-diol, etc., and a mixture of at least two species thereof, among which 2,2-bis(4-hydroxyphenyl)propane is preferable from the viewpoint of mechanical strength, reactivity and economy.

Examples of the branching agents include phloroglucin, 2,4,4'-trihydroxybenzophenone, 2,4,4'-trihydroxydiphenylether, 2,2-bis(2,4-dihydroxyphenyl) propane, 2,2',4,4'-tetrahydroxydiphenylmethane, 2,4,4'-trihydroxydiphenylmethane, 2,6-dimethyl-2,4,6-tri(4-hydroxyphenyl)-heptene-3, 4,6-dimethyl-2,4,6-tri(4-hydroxyphenyl)-heptane-2, 2,6-bis(2-hydroxy-5-methylbezil)-4-methylphenol, 2,6-bis(2-hydroxy-5-isopropylbenzil)-4-isopropylphenol, tetrakis(4-hydroxyphenyl)methane, α,α',α"-tris(4-hydroxyphenyl)-1,3,5-triisopropylbenzene, 1,1-bis(4-hydroxyphenyl)-1-[4-(4-hydroxyphenyl)isopropylphenyl]ethane and 1,1,1-tris(4-hydroxyaryl)alkanes.

Among above-mentioned branching agents, it is preferable to use particularly 1,1,1-tris(4-hydroxyaryl) alkanes.

Examples of 1,1,1-tris(4-hydroxyaryl)alkanes include 1,1,1-tris(4-hydroxyphenyl)methane, 1,1,1-tris(4-hydroxyphenyl)ethane, 1,1,1-tris(4-hydroxyphenyl) propane, 1,1,1-tris(2-methyl-4-hydroxyphenyl)methane, 1,1,1-tris(2-methyl-4-hydroxyphenyl)ethane, 1,1,1-tris(3-methyl-4-hydroxyphenyl)methane, 1,1,1-tris(3-methyl-4-hydroxyphenyl)ethane, 1,1,1-tris(3,5-dimethyl-4-hydroxyphenyl)methane, 1,1,1-tris(3,5-dimethyl-4-hydroxyphenyl)ethane, 1,1,1-tris(3-chloro-4-hydroxyphenyl)methane, 1,1,1-tris(3-chloro-4-hydroxyphenyl)ethane, 1,1,1-tris(3,5-dichloro-4-hydroxyphenyl)methane, 1,1,1-tris(3,5-dichloro-4-hydroxyphenyl)ethane, 1,1,1-tris(3-bromo-4-hydroxyphenyl)methane, 1,1,1-tris(3-bromo-4-hydroxyphenyl)ethane, 1,1,1-tris(3,5-dibromo-4-hydroxyphenyl)methane, 1,1,1-tris(3,5-dibromo-4-hydroxyphenyl)ethane, 1,1,1-tris(3-fluoro-4-hydroxyphenyl)methane, 1,1,1-tris(3-fluoro-4-hydroxyphenyl)ethane, 1,1,1-tris(3,5-difluoro-4-hydroxyphenyl)methane, 1,1,1-tris(3,5-difluoro-4-hydroxyphenyl)ethane, 1,1,1-tris(4-hydroxyphenyl)-1-phenylmethane, etc., among which 1,1,1-tris(4-hydroxyphenyl)ethane is most preferable from the viewpoint of reactivity and easy handling.

The amount of branching agent to be used for the branched polycarbonate resin of the present invention is optionally selected within the range able to maintain characteristics of the branched polycarbonate resin. Considering the range to depress production of solvent insoluble three dimensional polymer and to exhibit good non-Newtonian characteristic, it is preferable that the amount is 0.1 to 3.0 mol % to bisphenol.

Examples of monohydric phenols as molecular weight modifier include phenol, alkyl phenols including p-t-butylphenol, cumyl phenol, tribromophenol, p-n-octylphenol and p-n-stearylphenol, alkylether phenols including p-n-butoxyphenols and p-n-octyloxyphenol and alkyl hydroxybenzoates including n-butyl p-hydroxybenzoate, n-octyl p-hydroxybenzoate and n-stearyl p-hydroxybenzoate.

The monohydric phenol to be used as molecular weight modifier is added so as to able to maintain the molecular weight of the branched polycarbonate resin to preferable molecular weight range as molding material. The amount of monohydric phenol to be added is 0.5 to 10 mol % and preferably 1 to 5 mol % to bisphenol.

Phosgene is used usually in the range of 100 to 140 mol and preferably 105 to 120 mol per 100 mol of bisphenol. The injection time of phosgene is usually 10 to 120 minutes and preferably 15 to 60 minutes.

In conventional phosgene process, acid bonding agent such as pyridine, alkali metal hydroxides including sodium hydroxide and potassium hydroxide, etch, is used, among which preferably sodium hydroxide is used. It is preferable that the molar ratio of sodium hydroxids to bisphenol(s) is 2.0/1 to 3.5/1. Sodium hydroxide is used in the state of an aqueous solution. It is preferable that the concentration of sodium hydroxide in the aqueous solution is 6 to 10 (weight/volume) %. Water to be used herein is distilled water, ion exchange water or water recovered in the production of polycarbonate resin. Further, if necessary, a small amount of oxidation inhibitor such as sodium sulfite, hydrosulfite, etc., may be added.

Examples of the tetraammonium salts to be added after the completion of injection of phosgene include tetramethylammonium chloride, trimethylbenzylammonium chloride, triethylbenzylammonium chloride, tetraethylammonium bromide, tetra-n-butylammonium iodide, etc., among which trimethylbenzylammonium chloride and triethylbenzyl ammonium chloride are preferable. The tetraammonium salt is used usually in 0.0005 to 5 mol % to bisphenol.

The tetraammonium salt is added in the state of an aqueous solution so as to be dispersed sufficiently over the whole of the reaction system. It is preferable that the concentration of tetraammonium salt in the aqueous solution is 0.1 to 20 (weight/volume) %. The aqueous solution is added to the reaction mixture, preferably together with sodium hydroxide, after the completion of injection of phosgene. The time at which a viscosity average molecular weight (Mv) of the reaction mixture reaches to 3,000 or above and less than 6,000 after the completion of addition of the tetraammonium salt is 3 to 20 minutes, depending upon the reaction temperature and stirring conditions.

All the amount of the acid bonding agent to be used in the present invention may be initially charged or 70 to 96% of the amount of the acid bonding agent to be used may be initially charged and then 2 to 28% of the acid bonding agent at the time of addition of tetraammonium and 2 to 28% of the acid bonding agent at the time of addition of monohydric phenol may be further added.

In the present invention, the timing of addition of the monohydric phenol is significant to obtain the branched polycarbonate resin with less content of gel like particle. The monohydric phenol is added after a viscosity average molecular weight (Mv) of the reaction mixture has reached to 3,000 or above and less than 6,000, preferably 3,500 or above and less than 6,000 and more preferably 4,000 or above and less than 5,000.

At the time of addition of the monohydric phenol, it is possible to add a small amount of sodium hydroxide and the polymerization catalyst at the same time, Further, after adding the monohydric phenol to the reaction mixture, it is preferable to complete the polymerization with stirring for 30 to 120 minutes.

Examples of the polymerization catalysts to be used in the present invention include tertiary amines such as triethylamine, tertiary phosphine, tetraphosphonium salts, nitrogen-containing heterocyclic compounds and salts thereof, imino ethers and salts thereof, and compounds having an amido group(s), among which tertiary amines such as triethylamine are preferable. The amount of the polymerization catalyst to be added is 0.01 to 1 mol % to bisphenol.

The organic solvent to be used in the present invention is an organic compound which is insoluble in water and inert for the reaction and furthermore can dissolve polycarbonate produced by the reaction Examples of the organic solvents include chlorinated aliphatic hydrocarbons including dichloromethane, tetrachloroethane, chloroform, 1,2-dichloroethane, trichloroethane and dichloroethane, chlorimated aromatic hydrocarbons including chlorobenzene, dichlorobenzene and chlorotoluene, acetophenone, cyclohexane, anisole, etc, and a mixture thereof, among which dichloromethane is most preferably used. 0.1 to 2 L of the above-mentioned solvent(s) per 1 mol of bisphenol is used.

In the production of the branched polycarbonate resin of the present invention, it is preferable to use a reactor with a jacket, provided with a stirring apparatus, a gas injection tube and a condenser. Further, it is preferable that the reaction temperature is 10 to 25° C. at the time of injection of phosgene.

The branched polycarbonate resin of the present invention has a viscosity average molecular weight (Mv) of 15,000 to 45,000 from the viewpoints of mechanical strength and processings including blow molding. When the viscosity average molecular weight (Mv) is 45,000 or above, molding is difficult, whereas below 15,000 mechanical strength is decreased.

The dichloromethane insoluble gel in the present invention can be determined according to the following method. That is, a synthesized product of the branched polycarbonate resin of the present invention is changed to powders and again dissolved in dichloromethane and then filtered through a filter of 50 $\mu$m. The number of transparent gel derived from the polycarbonate is counted visually for the residue on the filter with an optical microscope. On the other hand, it is possible to remove gel component with a particle diameter more than 50 $\mu$m through a filter, for example, at the time of resin solution state at the time of melt extrusion. However, the branched polycarbonate obtained by removing thus gel component in post step is inferior to that depressed generation of gel component in reaction stage as in the present invention in the point of impact resistance and causes problems of blockage of the filter. Thus, such method is less effective than that of the present invention.

PREFERRED EMBODIMENT OF THE INVENTION

The present invention will be described in more detail below referring to Examples, which are not intended to limit the scope of the present invention.

EXAMPLE 1

9.12 kg (40 mol) of 2,2-bis (4-hydroxyphenyl) propane (hereinafter, BPA), 61.2 g (0.2 mol) of 1,1,1-tris(4-hydroxyphenyl)ethane (hereinafter, TPE) and 10 g of hydrosulfite were dissolved in 48 L of 8.8% (w/v) aqueous sodium hydroxide solution. Then, 36 L of dichloromethane was added thereto and 4.6 kg of phosgene was injected over 46 minutes with stirring while keep the liquid at 15° C.

After the completion of injection of phosgene, 4.5 g (0.02 mol) of triethylbenzylammonium chloride (hereinafter, AC1) was dissolved in 1 L of above-mentioned sodium hydroxide and then added to the reaction liquid and the resultant reaction mixture was vigorously stirred for 10 minutes. At this time, the viscosity average molecular weight (Mv) of the reaction mixture was 4,800. Then 228 g (1.52 mol) of p-t-butylphenol (hereinafter, PTBP), 1 L of aqueous sodium hydroxide solution and 10 ml of triethylamine was added thereto and further stirred for 50 minutes at about 25° C., thus completing the polymerization.

The resulting polymerization liquid was separated into an aqueous phase and an organic phase by centrifugal separation at 500 G. The aqueous phase, low weight impurities and heavy weight impurities were removed from the organic phase and then the organic phase was neutralized with phosphoric acid and repeatedly washed with water and centrifugal separation was repeated until the electrical conductivity of washing water becomes 10 $\mu$S or below. Then, the organic phase was added in drop wise to hot water of 45° C. to precipitate the polymer. Then, the precipitate was filtered and then dried, whereby a powdery polymer was obtained.

The viscosity average molecular weight (Mv) of the polymer thus obtained was measured and 27,800. 1 L of 10 w/v % resin solution which was again dissolved with dichloromethan was filtered through a Teflon filter of pore diameter 50 $\mu$m. Residue derived from the resin was not confirmed in residues on the filter. The above-mentioned polymer was analyzed with infrared absorption spectrum. Absorption due to carbonyl group in the vicinity of 1770 $cm^{-1}$ and absorption due to ether bond in the vicinity of 1240 $cm^{-1}$ was detected. It was confirmed that the polymer had carbonyl bond. The monomer in the branched polycarbonate was analyzed by GPC. BPA was 20 ppm or below.

The branched polycarbonate powder was extruded at 320° C. with an extruder of 50 mm, provided with a vent, whereby melt pellets were obtained.

EXAMPLE 2

The experiment was performed in the same manner as in Example 1 except that 61.2 g (0.2 mol) of TPE was changed to 122.4 g (0.4 mol). Before adding PTBP, aqueous sodium hydroxide solution and triethylamine, the viscosity average molecular weight (Mv) of the reaction mixture was 5,300. The viscosity average molecular weight (Mv) of the polymer thus obtained was 35,800.

EXAMPLE 3

The experiment was performed in the same manner as in Example 1 except that 58.4 g (0.2 mol) of 1,1,1-tris(4-hydroxyphenyl)methane (hereinafter, TPH) was used instead of TPE. Before adding PTBP, aqueous sodium hydroxide solution and triethylamine, the viscosity average molecular weight (Mv) of the reaction mixture was 4,900. The viscosity average molecular weight (Mv) of the polymer thus obtained was 27,100.

EXAMPLE 4

The experiment was performed in the same manner as in Example 1 except that 7.5 g (0.04 mol) of trimethylbenzylammonium chloride (hereinafter, AC2) was used instead of AC1. Before adding PTBP, aqueous sodium hydroxide solution and triethylamine, the viscosity average molecular weight (Mv) of the reaction mixture was 4,700. The viscosity average molecular weight (Mv) of the polymer thus obtained was 27,500.

EXAMPLE 5

The experiment was performed in the same manner as in Example 1 except that 61.2 g (0.2 mol) of TPE and 4.5 g (0.02 mol) of AC1 were changed to 244.8 g (0.8 mol) of TPE and 27 g (0.12 mol) AC1, respectively, and 225.6 g (2.4 mol) of phenol (hereinafter, PH) was used instead of PTBP. Before adding PTBP, aqueous sodium hydroxide solution and triethylamine, the viscosity average molecular weight (Mv) of the reaction mixture was 5,900. The viscosity average molecular weight (Mv) of the polymer thus obtained was 42,400.

EXAMPLE 6

The experiment was performed in the same manner as in Example 1 except that 61.2 g (0.2 mol) of TPE and 4.5 g (0.02 mol) of AC1 and 228 g (1.52 mol) of PTBP were changed to 24.48 g (0.08 mol) of TPE, 1 g (0.004 mol) of AC1 and 120 g (0.8 mol) of PTBP respectively. Before adding PTBP, aqueous sodium hydroxide solution and triethylamine, the viscosity average molecular weight (Mv) of the reaction mixture was 3,100. The viscosity average molecular weight (Mv) of the polymer thus obtained was 40,700.

EXAMPLE 7

The experiment was performed in the same manner as in Example 1 except that 84.8 g (0.2 mol) of 1,1-bis(4-hydroxyphenyl)-1-[4-(4-hydroxyphenyl) isopropylphenyl] ethane(hereinafter, TPPA) was used instead of TPE Before adding PTBP, aqueous sodium hydroxide solution and triethylamine, the viscosity average molecular weight (Mv) of: the reaction mixture was 4,800. The viscosity average molecular weight (Mv) of the polymer thus obtained was 27,500.

EXAMPLE 8

The experiment was performed in the same manner as in Example 1 except that 96 g (0.2 mol) of α,α',α"-tris(4-hydroxyphenyl)-1,3,5-triisopropyl-benzene(hereinafter, TPTB) was used instead of TPE. Before adding PTBP, aqueous sodium hydroxide solution and triethylamine, the viscosity average molecular weight (Mv) of the reaction mixture was 4,900. The viscosity average molecular weight (Mv) of the polymer thus obtained was 27,500.

COMPARATIVE EXAMPLE 1

The experiment was performed in Example 1 except that AC1 was not used. After the completion of injection of phosgene, the viscosity average molecular weight (Mv) of the reaction mixture was 1,900. The viscosity average molecular weight (Mv) of the polymer thus obtained was 28,600.

COMPARATIVE EXAMPLE 2

The experiment was performed in Example 2 except that AC1 was not used. After the completion of injection of phosgene, the viscosity average molecular weight (Mv) of the reaction mixture was 2,000. The viscosity average molecular weight (Mv) of the polymer thus obtained was 36,500.

COMPARATIVE EXAMPLE 3

The experiment was performed in Example 3 except that AC1 was not used. After the completion of injection of phosgene, the viscosity average molecular weight (Mv) of the reaction mixture was 1,800. The viscosity average molecular weight (Mv) of the polymer thus obtained was 27,800.

COMPARATIVE EXAMPLE 4

The experiment was performed in Example 5 except that AC1 was not used. After the completion of injection of phosgene, the viscosity average molecular weight (Mv) of the reaction mixture was 1,900. The viscosity average molecular weight (Mv) of the polymer thus obtained was 43,800.

COMPARATIVE EXAMPLE 5

The experiment was performed in Example 6 except that AC1 was not used. After the completion of injection of phosgene, the viscosity average molecular weight (Mv) of the reaction mixture was 1,700. The viscosity average molecular weight (Mv) of the polymer thus obtained was 41,400.

COMPARATIVE EXAMPLE 6

The experiment was performed in the same manner as in Example 1 except that 9.12 kg (40 mol) of BPA and 10 g of hydrosulfite were dissolved in 48 L of 88% (w/v) aqueous sodium hydroxide solution. Then, 36 L of dichloromethane was added there-to and 4.6 kg of phosgene was injected over 46 minutes with stirring while keep the liquid at 15° C. After the completion of injection of phosgene, 4.5 g (0.02 mol) of AC1 was dissolved in 1 L of abovementioned sodium hydroxide and then added to the reaction liquid and the resultant reaction mixture was vigorously stirred for 10 minutes. At this time, the viscosity average molecular weight (Mv) of the reaction mixture was 3,400.

Then, 228 g (1.52 mol) of PTBP, 61.2 g (0.2 mol) of TPE, 1 L of aqueous sodium hydroxide solution and 10 ml of triethylamine was added thereto and further stirred for 50 minutes at about 25° C., thus completing the polymerization. The viscosity average molecular weight (Mv) of the polymer thus obtained was 26,600.

The components and analyzed values of the polycarbonate in Examples 1 to 8 and Comparative Examples 1 to 6 are shown in Tables 1 and 2. Further, obtained polymers were again dissolved in dichloromethane and filtered through a filter of pore diameter 50 μm and number of gel in the residues on the filter were counted. The numbers of gel, N values (structural viscosity index) measured for obtained pellets and Izod impact strength measured 10 samples of injection molded articles, molded using the pellets and standard deviation thereof also were shown in Tables 1 and 2.

Abbreviations used in Tables 1 and 2 have the following meanings:

BPA: 2,2-bis(4-hydroxyphenyl)propane
TPE: 1,1,1-tris(4-hydroxyphenyl)ethane
TPM: 1,1,1-tris(4-hydroxyphenyl)methane
TPPA: 1,1-bis(4-hydroxyphenyl)-1-[4-(4-hydroxyphenyl) isopropylphenyl]ethane
TPTB: α,α',α"-tris(4-hydroxyphenyl)-1,3,5-triisopropylbenzene AC1: triethylbenzylammonium chloride
AC2: trimethylbenzylammonium chloride
PTBP: p-t-butylphenol
PH: phenol
Mv: viscosity average molecular weight

[Measurement Method]
(Viscosity Average Molecular Weight (Mv))

Intrinsic viscosity (dl/g) of 0.5 w/v % dichloromethane resin solution at 20° C. was measured in Huggin's constant 0.45 and Mv was calculated from the following Schnell's formula.

Intrinsic viscosity=$1.23 \times 10^{-4}$ (Mv)$^{0.88}$ (N Value)

Flow value Q (cm$^2$/sec) was measured under two conditions of pressure at 280° C. in nozzle diameter 1 mm×length 10 mm with a flow tester. N value (structural viscosity index) was calculated from the following formula.

N value=log($Q_1$/$Q_2$)/log(15.68/3.92)

$Q_1$: flow value under 15.68 MPa
$Q_2$: flow value under 3.92 MPa (Izod Impact Strength)

Izod impact strength (J/m) was for 10 samples of molded article of thickness 3.2 mm with notch for Izod, injection molded at 320° C. according to ASTM D256 and its average value was calculated.

(Standard Deviation of Izod Impact Strength)

Standard Deviation was calculated for above-mentioned 10 values of Izod impact strength.

(Number of Gel)

The sample of the branched polycarbonate powder was again dissolved in dichloromethan to adjust to 10 w/v % liquid in a clean room of class 1000 and then filtered under an applied pressure through a Teflon filter of pore diameter 50 μm and diameter 47 mm. Then, gel components derived from polycarbonate in the residue on the filter were counted with an optical microscope having 50 magnification.

The branched polycarbona-te resin provides less degradation due to heat history at a high temperature and has more excellent impact resistance than those of conventional branched polycarbonate resin since the former has less solvent insoluble gel component than the latter and particularly is suitable to blow moldings sheet extrusion molding and injection molding on which long time heat history is imposed.

TABLE 1

| Example No. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Bisphenol | BPA | BPA | BPA | BPA | BPA | BPA | BPA | BPA |
| (mol) | 40 | 40 | 40 | 40 | 40 | 40 | 40 | 40 |
| Branching agent | TPE | TPE | TPM | TPE | TPE | TPE | TPPA | TPTB |
| mol % | 0.5 | 1.0 | 0.5 | 0.5 | 2.0 | 0.2 | 0.5 | 0.5 |
| Molecular weight modifier | PTBP | PTBP | PTBP | PTBP | PH | PTBP | PTBP | PTBP |
| mol % | 3.8 | 3.8 | 3.8 | 3.8 | 6.0 | 2.0 | 3.8 | 3.8 |
| Tetraammonium salt | AC1 | AC1 | AC1 | AC2 | AC1 | AC1 | AC1 | AC1 |
| mol % | 0.05 | 0.05 | 0.05 | 0.1 | 0.3 | 0.01 | 0.05 | 0.05 |
| Mv × 10$^4$ | 2.78 | 3.58 | 2.71 | 2.75 | 4.24 | 4.07 | 2.75 | 2.75 |
| Number of gel | 0 | 0 | 0 | 1 | 3 | 0 | 1 | 0 |
| N value | 1.61 | 1.84 | 1.61 | 1.60 | 1.98 | 1.35 | 1.60 | 1.61 |
| Izod impact strength (J/m) | 816 | 778 | 813 | 809 | 751 | 870 | 821 | 836 |
| Standard deviation of Izod impact strength | 3.0 | 2.9 | 2.6 | 3.2 | 4.1 | 2.4 | 3.4 | 2.6 |

TABLE 2

| Comparative Example No. | CEx. 1 | CEx. 2 | CEx. 3 | CEx. 4 | CEx. 5 | CEx. 6 |
| --- | --- | --- | --- | --- | --- | --- |
| Bisphenol | BPA | BPA | BPA | BPA | BPA | BPA |
| (mol) | 40 | 40 | 40 | 40 | 40 | 40 |
| Branching agent | TPE | TPE | TPM | TPE | TPE | TPE |
| mol % | 0.5 | 1.0 | 0.5 | 2.0 | 0.2 | 0.5 |
| Molecular weight modifier | PTBP | PTBP | PTBP | PH | PTBP | PTBP |
| mol % | 3.8 | 3.8 | 3.8 | 6.0 | 2.0 | 3.8 |
| Tetraammonium salt | — | — | — | — | — | AC1 |
| mol % | — | — | — | — | — | 0.05 |
| Mv × 10$^4$ | 2.86 | 3.65 | 2.78 | 4.38 | 4.14 | 2.66 |
| Number of gel | 14 | 17 | 13 | 25 | 11 | 12 |
| N value | 1.63 | 1.84 | 1.62 | 2.01 | 1.31 | 1.59 |
| Izod impact strength (J/m) | 788 | 739 | 797 | 698 | 856 | 802 |
| Standard deviation of Izod impact strength | 11.2 | 11.5 | 14.9 | 21.3 | 10.3 | 8.7 |

What is claimed is:

1. A branched polycarbonate resin having a viscosity average molecular weight (Mv) of 15,000 to 45,000, the number of dichloromethane insoluble gel-like particles with a particle diameter more than 50 μm being 10 or below per 100 g of the resin, obtained by reacting bisphenol, trihydric or higher phenol as a branching agent and phosgene in the presence of both an alkali aqueous solution and organic solvent, then, further adding a tetraammonium salt to the reaction mixture, thereby, starting a polycondensation reaction, then, adding both a monohydric phenol as a molecular weight modifier and a tertiary amine polymerization catalyst to the reaction mixture and further performing a polycondensation reaction.

2. A branched polycarbonate resin according to claim 1, wherein said trihydric or above phenol as branching agent is 1,1,1-tris(4-hydroxyaryl)alkane.

3. A branched polycarbonate resin according to claim 1, wherein said trihydric or above phenol as branching agent is 1,1,1-tris(4-hydroxyphenyl)ethane.

4. A branched polycarbonate resin according to claim 1, wherein said bisphenol is 2,2-bis(4-hydroxyphenyl)propane.

5. A process for producing a branched polycarbonate resin comprising the steps of:

reacting bisphenol, trihydric or above phenol as branching agent and phosgene in the presence of both an alkali aqueous solution and organic solvent, then, further adding a tetraammonium salt to the reaction mixture, thereby, starting polycondensation reaction, then, adding both monohydric phenol as molecular weight modifier and a tertiary amine polymerization catalyst to the reaction mixture, further performing polycondensation reaction, and thereby, obtaining the branched polycarbonate resin having a viscosity average molecular weight (Mv) of 15,000 to 45,000, number of dichloromethane insoluble gel like particle with a particle diameter more than 50 μm being 10 or below per 100 g of the resin.

6. A process according to claim 5, wherein said tetraammonium salt is trimethylbenzilammonium chloride or triethylbenzilammonium chloride.

7. A process for producing a branched polycarbonate resin comprising the steps of:

reacting bisphenol, trihydric or higher phenol as a branching agent and phosgene in the presence of both an alkali aqueous solution and an organic solvent, then, further adding a tetraammonium salt to the reaction mixture, thereby, starting a polycondensation reaction, after a viscosity average molecular weight (Mv) of the reaction mixture containing the resultant products has reached to 3,000 or above and less than 6,000, adding both a monohydric phenol as a molecular weight modifier and a tertiary amine polymerization catalyst to the reaction mixture, further performing a polycondensation reaction, and thereby obtaining the branched polycarbonate resin having a viscosity average molecular weight (Mv) of 15,000 to 45,000, the number of dichloromethane insoluble gel-like particles with a particle diameter more than 50 μm being 10 or below per 100 g of the resin.

8. A process according to claim 7, wherein said tetraammonium salt is trimethylbenzilammonium chloride or triethylbenzilammonium chloride.

* * * * *